United States Patent Office 3,646,163
Patented Feb. 29, 1972

3,646,163
SHAPING COMPOSITION OF CHLORINATED POLYVINYL CHLORIDE HAVING IMPROVED HEAT COLORATION
Susumu Taima, Uozu-shi, and Saiji Nozaki, Unazuki-machi, Japan, assignors to Nippon Carbide Kogyo Kabushiki Kaisha, Tokyo, Japan
Continuation-in-part of application Ser. No. 620,479, Mar. 3, 1967. This application Oct. 15, 1969, Ser. No. 866,509
Claims priority, application Japan, Mar. 5, 1966, 41/13,150
Int. Cl. C08f 41/12
U.S. Cl. 260—876 R                4 Claims

ABSTRACT OF THE DISCLOSURE

A chlorinated polyvinyl chloride composition for shaping having a markedly improved heat coloration property without substantially lowering the improved heat-softening point inherently possessed by chlorinated polyvinyl chloride, such composition comprising 100 parts by weight of chlorinated polyvinyl chloride with a chlorine content of not less than 60% by weight and 3–40 parts by weight of a butadiene-styrene-methylmethacrylate copolymer blended therewith. The copolymer consists of above 1% and up to 70% by weight of methyl methacrylate, 1–95% by weight of butadiene and 3–65% by weight of styrene the sum of these three components being 100% by weight.

---

Figure 1:
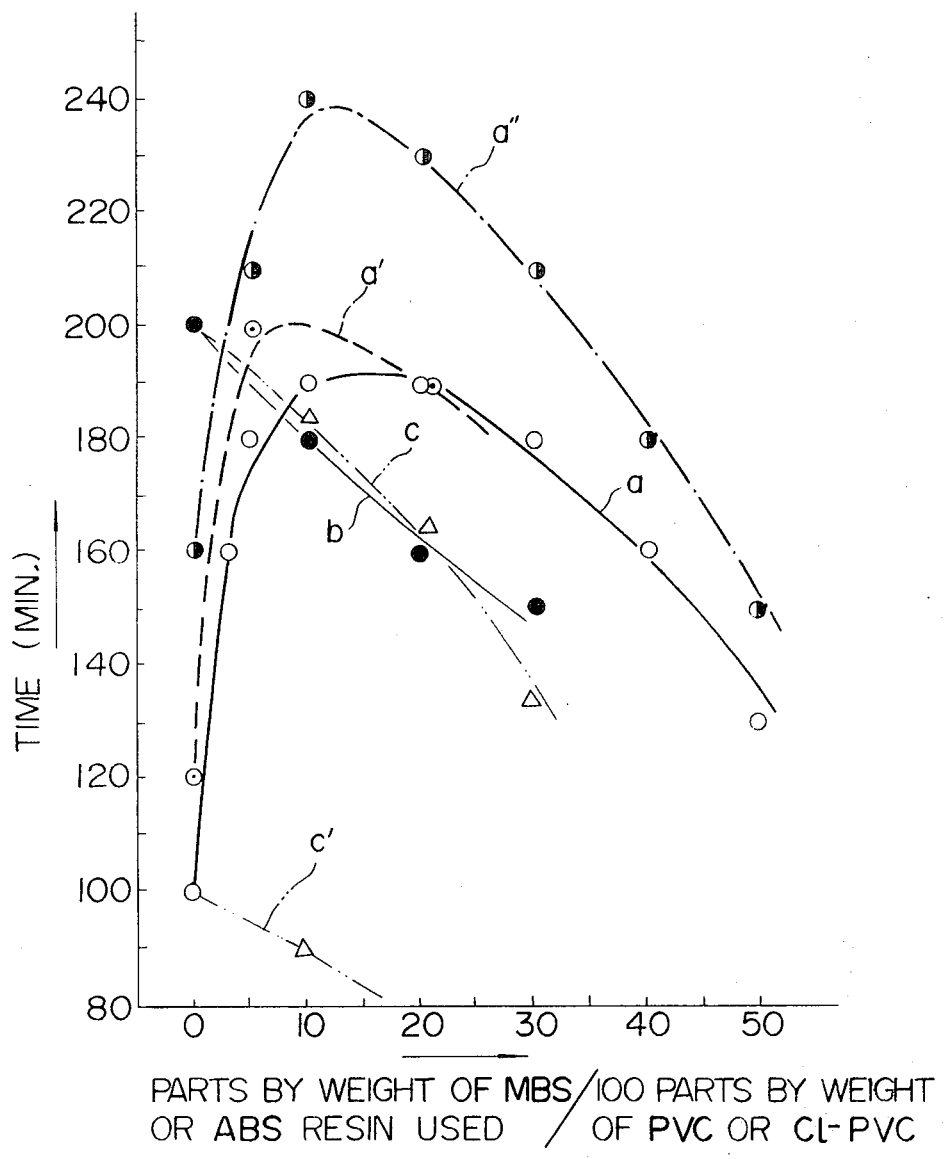

This invention is a continuation-in-part application of U.S. Ser. No. 620,479, now abandoned, filed Mar. 3, 1967 claiming Convention priority from Japanese patent application No. 13150/66 filed Mar. 5, 1966.

This invention relates to a shaping composition of chlorinated polyvinyl chloride having a markedly improved heat coloration property, such composition being incidentally improved in heat flowability during shaping and in impact strength without being substantially lowered in its improved heat-softening point inherently possessed by chlorinated polyvinyl chloride. More particularly, this invention relates to a shaping composition of chlorinated polyvinyl chloride having improved heat coloration properties consisting essentially of a blend of:

(A) Chlorinated polyvinyl chloride having a chlorine content of not less than 60% by weight, preferably 63–70% by weight and
(B) A copolymer consisting of above 1% and up to 70% by weight of methylmethacrylate, 1–95% by weight of butadiene and 3–65% by weight of styrene, the sum of these three components being 100% by weight, such copolymer (B) being present in an amount of from 3–40 parts, preferably 5–30 parts per 100 parts by weight of (A).

By the term "heat coloration property" used herein is meant a quality of a composition being colored black by heating.

A polyvinyl chloride resin is an inexpensive and readily available resin material with good resistance to chemicals and excellent processability, and has heretofore found wide applications. On the other hand, it possesses only a low heat-softening point, which has constituted a great setback against the commercial utilization of polyvinyl chloride resin.

For removing this defect, there was developed a technique of obtaining a resin with improved heat-softening point by chlorinating polyvinyl chloride, and many proposals have been made with respect to this technique. It is true that by such attempt the heat-softening point of chlornated polyvinyl chloride was improved, but on the other hand, it inevitably exhibits a considerable deterioration of heat flowability, remarkable deterioration of heat coloration property at a shaping temperature, and a somewhat degraded impact strength.

Particularly, the deterioration of heat coloration property at the shaping temperature can be understood from the fact that according to the test method to be mentioned later, the time for black coloration (in minutes) is 200 for polyvinyl chloride, while it is 100 for chlorinated polyvinyl chloride (with a chlorine content of 67% by weight) obtained by chlorinating the same polyvinyl chloride. This means that it is possible to raise the heat-softening point by chlorination, but the heat coloration property at the shaping temperature is inevitably degraded even to ½.

Unless this new defect is removed, it is practically difficult to utilize a chlorinated polyvinyl chloride resin as a shaping material, and its application is considerably limited.

Before the filing of the Japanese patent application No. 13150/66 mentioned at the outset of this specification, there had been proposed a composition consisting of a blend of an acrylonitrilebutadiene-styrene copolymer (ABS resin for short) and polyvinyl chloride (PVC resin for short) (U.S. Pat. 2,924,545) and a composition consisting of a blend of ABS resin and chlorinated polyvinyl chloride (Cl–PVC resin for short). After the filing of such Japanese patent application, U.S. Pat. 3,268,626 proposed a blend of Cl–PVC resin and ABS resin, and U.S. Pat. 3,288,886 proposed a blend of PVC resin and a butadiene-styrene-methyl methacrylate copolymer (MBS resin for short).

However, there had been no proposal before the filing of the present application to blend Cl–PVC resin with MBS resin. In any of the above-mentioned proposals, the resins to be blended acted as an impact modifier for PVC resin or Cl–PVC resin, but the obtained compositions had a substantially deteriorated heat coloration property.

As will be described in detail with reference to the drawings, if a butadiene modified high impact resin such as an ABS resin or MBS resin which is similar to that used in this invention is blended with polyvinyl chloride, the impact strength can be improved but the heat coloration property tends to be worsened with an increase of the amount to be blended. On the other hand, when ABS resin is blended with Cl–PVC resin, the heat coloration property is worsened.

We have found that in spite of this, when MBS resin is incorporated into the Cl–PVC resin (present invention), the heat coloration property is markedly improved, and this improvement is to a greater degree as the blending amount increases and after having reached the maximum, the improvement curve declines as is shown in the accompanying drawing. Surprisingly, we have found that this property can be improved to a degree same as that of the polyvinyl chloride which has not been chlorinated. This improvement is remarkably advantageous commercially in view of the fact that the shaping temperature required of the original polyvinyl chloride is far higher than that required of chlorinated polyvinyl chloride because of an improved far higher heat-softening point of chlorinated polyvinyl chloride. It has also been found that the improved heat-softening point brought about by chlorination is not substantially lowered by the blending. Concurrently, the composition is improved in heat flowability during processing, and shaped articles obtained from such composition have also been improved with respect to impact strength and transparency.

It is quite unexpected that only in a combination of Cl–PVC resin and MBS resin which is disclosed by none of the prior proposals, the heat coloration property at shaping temperatures can be remarkably improved.

As will be described later with reference to the drawings, it has been found that the heat coloration property of the resulting composition is critically deteriorated when ABS resin having an acrylonitrile (AN for short) content slightly over 1% by weight is added to Cl–PVC resin, and this property is more deteriorated when ABS resin having an AN content of 3% by weight is added, but that when MBS resin having a methyl methacrylate (MMA for short) content of slightly over 1% by weight is added to Cl–PVC resin, such deterioration does not occur in the resulting composition, and although gradually, the heat coloration property is enhanced with an increase in the MMA content.

Accordingly, an object of this invention is to provide a shaping composition of chlorinated polyvinyl chloride markedly improved in heat coloration property inevitably possessed by chlorinated polyvinyl chloride.

Many other objects and advantages of this invention will become apparent from the following description.

According to this invention, Cl–PVC resin having a chlorine content of not less than 60% by weight, preferably 63–70% by weight based on the chlorinated polyvinyl chloride is used. Such a resin and various methods of its preparation are known. As the Cl–PVC resin to be utilized in this invention, a chlorinated polyvinyl chloride homopolymer is especially preferable. Although it is possible to use Cl–PVC resin containing other comonomer components, for instance, a Cl–PVC resin obtained by chlorinating PVC polymer containing a known comonomer containing a vinyl group such as vinyl acetate, vinylidene chloride, alkyl acrylate, alkyl methacrylate and alkyl maleate, the comonomer component in a PVC polymer before chlorination should be not over 5% by weight.

A Cl–PVC resin with more comonomer component is known, but is unsuitable as the Cl–PVC resin for the composition of this invention having a high heat-softening point and markedly improved heat coloration property. The "chlorinated polyvinyl chloride" referred to in this invention includes chlorinated polyvinyl chlorides prepared by chlorinating PVC resins containing not over 5% by weight of a comonomer with a vinyl group and excludes those prepared by chlorinating PVC resins containing over 5% by weight of the comonomer.

Chlorinated polyvinyl chloride with less than 60% by weight of a chlorine content is incapable of providing a shaped article with a heat-softening point which is satisfactorily high even when used to produce the composition of this invention. Hence, chlorinated polyvinyl chloride with a chlorine content of not less than 60% by weight should be chosen in this invention. Especially marked effects can be obtained with the use of chlorinated polyvinyl chloride with a chlorine content of 63–70% by weight.

The MBS resin to be incorporated into Cl–PVC resin in this invention and methods of its preparation are also known, and the improvement of heat coloration property is hardly affected by the method. Such MBS resin can be produced, for instance, by polymerising styrene in a butadiene-methylmethacrylate copolymer latex, polymerizing methylmethacrylate in a butadiene-styrene copolymer latex, polymerizing methyl methylmethacrylate and styrene in a polybutadiene latex, or polymerizing methacrylate, butadiene and styrene simultaneously.

The amount of MBS resin to be blended is 3–40 parts by weight, preferably 5–30 parts by weight, based on 100 parts by weight of Cl–PVC resin. This will be clearer from the explanation which will be made later with reference to the drawings. If the amount is too small, sufficient improvement of heat coloration property cannot be expected. The effect of improvement is increased abruptly by the addition of the smallest possible amount. Usually, the maximum effect of improvement is exhibited by the addition of 5–25 parts by weight, and gets lowered with the further increase of the amount of the MBS resin to be added. On the other hand, the heat-softening point of Cl–PVC remains almost unchanged but substantially tends to go down when the amount of the MBS resin exceeds about 40 parts by weight. In this invention, therefore, the MBS resin should be used in an amount within the range of 3 to 40 parts by weight.

The MBS resin utilized in the present invention has the following composition.

MMA (methyl methacrylate): over 1% by weight and up to 70% by weight, preferably 2 to 60% by weight, particularly preferably 10 to 45% by weight.

B (butadiene): 1–95% by weight, preferably 2 to 80% by weight, particularly preferably 30 to 70% by weight.

S (styrene): 3 to 65% by weight, preferably 14 to 55% by weight.

The sum of MMA, B and S should be 100% by weight.

With MBS resin having an MMA content of less than 1% by weight, there is no appreciable remarkable improvement in heat coloration property, as compared with the addition of ABS resin. If the MMA content exceeds 70% by weight, there is a lowering in impact strength, and there is no further improvement in heat coloration property. It is therefore advisable to use MMA in an amount not more than 70% by weight. When B content is below 1% by weight, there is no improvement in heat coloration property, and if it exceeds 95% by weight, the heat-softening point of the composition decreases and the advantages of Cl–PVC resin are lost. With an S content of less than 3% by weight, the heat-softening point decreases, and the advantages of Cl–PVC resin are degraded. Amounts of S above 65% by weight constitute a setback against the processability of the resulting composition.

Now, the heat coloration improvement effect of the composition of this invention will be explained with reference to the accompanying FIG. 1.

Curve $a$ shows the time for black coloration as measured by the test method to be described before the examples below, with respect to compositions comprising 100 parts by weight of Cl–PVC resin with a chlorine content of 67% by weight blended with 0–50 parts by weight of MBS (MMA—15, B—30, S—55% by weight) resin. Curve $b$ shows the time for black coloration measured with respect to PVC resin before being chlorinated. Curve $c$ indicates the time for black coloration measured with respect to a composition comprising the PVC resin blended with ABS (AN—15, B—30, S—55% by weight) resin. Furthermore, curve $c'$ shows the time for black coloration measured with respect to a composition comprising the same Cl–PVC resin blended with the ABS resin. Incidentally, in the drawing, there are curve $a'$ showing the result measured in the same manner as in curve $a$ except that a Cl–PVC resin with a chlorine content of 63% by weight was used and curve $a''$ showing the result with respect to the same composition as in the curve $a$ when MBS (MMA—31.5, B—37.5, S—31) resin and a different proportion of the blend were employed.

Comparison of curve $a$ with curve $b$ makes it clear that the antiheat coloration property shown in terms of the time for black coloration of a composition comprising PVC resin blended with MBS resin is degraded with the increase of the amount of MBS resin to be blended. On the other hand, it is found that in the curve $a$ for the composition of the present invention, antiheat coloration property is abruptly improved with the addition of the MBS resin, that the curve indicates a decline after it has reached the maximum, and that the antiheat coloration property of the chlorinated composition has been improved comparable to that of the original PVC resin. The same can be said of the curve $a'$ and $a''$.

It can be understood from the comparison of curve $a$ according to this invention with curves $c$ and $c'$ that even if ABS resin is used instead of MBS resin, the result is the same as that shown by curve $b$ and that when ABS resin is incorporated into Cl–PVC (curve $c'$), the result is too bad to be comparable.

In this invention, when the amount of MBS resin to be blended reaches 40% by weight, there is a substantial decline in the heat-softening point although this is not shown in the drawing. Curve a' shows an example wherein the chlorine content of Cl–PVC resin is smaller than that of Cl–PVC of curve a, which indicates that a substantial lowering of the heat-softening point occurs when the blending amount is smaller than that of Cl–PVC of curve a. Also, curve a'' concerns a composition containing an additive which may not adversely affect the transparency of a shaped product to be obtained therefrom.

Figure 2:
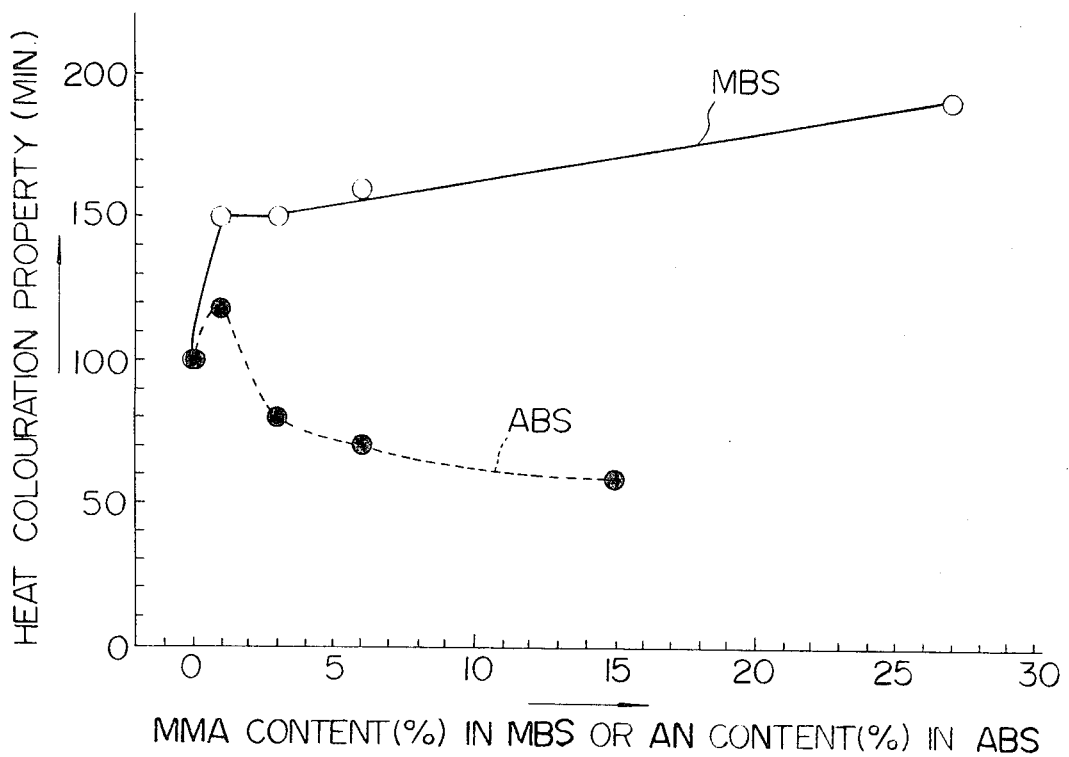

FIG. 2 is a graphic representation showing the results of testing the heat coloration property of compositions consisting of 100 parts by weight of Cl–PVC resin with a chlorine content of 67% by weight and 20 parts by weight of MBS resin of varying MMA content (percent by weight) or ABS resin of varying AN content (percent by weight) and a ratio of B to S of 3:1.

It is seen from FIG. 2 that when MBS resin is blended, the heat coloration property of the composition is enhanced even when an MMA content exceeds 1% by weight, but when ABS resin is blended, the heat coloration property of the composition gets abruptly worse if the AN content exceeds 1% by weight, and that when the AN content exceeds 3% by weight, the heat coloration property is extremely worsened as compared with the heat coloration property inherently possessed by Cl–PVC resin.

It is permissible to incorporate a minor amount of an ordinarily used additive for a shaping composition such as a heat stabilizer, light-proof agent, filler, coloring agent, lubricant, mold releasing agent and antioxidant into the composition of the present invention. As such additive, we can cite tri-basic lead sulphate, dibasic lead stearate, metal salts of stearic acid, dibutyl tin maleate, butyl stearate and paraffin wax.

For carrying out the blending according to this invention, any mixing means usually used in the formation of such a shaping resin composition can be employed. The order of blending is not particularly limited. Such an apparatus as a mixing roll, calender roll, ribbon blender, Henschel mixer and Banbury mixer can be used to effect the blending.

In addition to the retaining of an improved preferable heat-softening point of chlorinated polyvinyl chloride and a marked improvement of heat coloration property inevitably possessed by chlorinated polyvinyl chloride, the composition of this invention is concurrently improved in impact strength, heat flowability and transparency.

This invention will now be described with reference to the working examples, by which the invention is in no way limited. The conditions for the preparation of test pieces and methods of tests are as follows.

HEAT PENETRATION TEST AND IMPACT STRENGTH TEST (1) Preparation of test pieces The resin composition components were kneaded for 15 minutes by means of a mixing roll of a roll temperature of 170° C. to make a sheet. This sheet was hot pressed for 10 minutes at a temperature of 190° C. and a pressure of 50 kg./cm.$^2$ (gauge) to obtain test pieces.

(2) Test methods (i) *Impact strength.*—A V-notched test piece (10 mm. x 15 mm. x 2 mm.) is subjected to this test twice in accordance with DIN 53453 Dynstat method, and a mean value of the two measurements is calculated.

(ii) *Heat penetration test.*—A test piece (10 mm. x 15 mm. x 2 mm.) is subjected twice to this test in accordance with JIS K 6742 method, and a mean value of the two measurements is calculated. The heat peneration temperature goes down with a decline in the heat-softening point.

HEAT COLORATION TEST (1) Preparation of test piece

A test piece was prepared from the same sheet used in the above mentioned tests, except that the sheet was not hot-pressed.

(2) Test method

A test piece (50 mm. x 40 mm. x 0.5 mm.) is hung in a gear oven maintained at a temperature of 190° C., and the time from then until the test piece is colored black is determined. A shorter time for black coloration means a worse anti-heat coloration property.

EXAMPLES 1–6 AND COMPARATIVE EXAMPLE 1

| | Parts by weight |
|---|---|
| Chlorinated polyvinyl chloride [1] | 100 |
| Methylmethacrylate-butadiene-styrene copolymer: | |
| MMA | 20 |
| B | 30 |
| S | 50 |
| Tribasic lead sulfate | 4 |
| Dibasic lead stearate | 1 |

[1] Chlorine content 67% by weight; product of Nippon Carbide Kogyo K. K., Japan.

The above components were charged into a ribbon blender and mixed for about 15 minutes at room temperature to obtain a resinous composition (an opaque mixture). Seven types of compositions were prepared by changing an amount of the MBS resin mixed and tests were made by using each of the compositions according to the test method stated previously. The results are given in the following Table 1.

TABLE 1

| | Con-trol | Examples | | | | | | Comp. Ex. 1 |
|---|---|---|---|---|---|---|---|---|
| | | 1 | 2 | 3 | 4 | 5 | 6 | |
| Parts by weight: | | | | | | | | |
| Cl–PVC | 100 | 100 | 100 | 100 | 100 | 100 | 100 | 100 |
| MBS resin | 0 | 3 | 5 | 10 | 20 | 30 | 40 | 50 |
| Heat coloration property (min.) | 100 | 165 | 186 | 194 | 193 | 182 | 161 | 125 |
| Heat penetration (° C.) | 125 | 125 | 124 | 124 | 124 | 124 | 120 | 115 |
| Impact strength (kg.cm.c/m.$^2$) | 2.5 | 6 | 7 | 14 | 22 | 20 | 20 | 18 |

A heat penetration of a non-chlorinated PVC resin was 85° C. and its impact strength was 3.5 kg. cm./cm.$^2$. The constituents of the control composition are the same as those of other compositions except that MBS resin is not incorporated. This is the same in the following tables.

It can be seen from the above result that the composition of the present application is remarkably improved in the heat coloration property of chlorinated polyvinyl chloride and incidentally in impact strength without harming the improvement in heat-softening temperature of the chlorinated polyvinyl chloride (heat penetration).

EXAMPLES 7 TO 11 AND COMPARATIVE EXAMPLES 2 TO 9

The procedures of Examples 1 to 6 were repeated except that MBS resins of varying MMA, B and S contents where used. The results are shown in Table 2.

Compositions in examples and comparative examples

| | Parts by weight |
|---|---|
| Cl–PVC (Cl:67%) | 100 |
| Tribasic lead sulfate | 4 |
| Dibasic lead sulfate | 1 |
| Modifier | (1) |

[1] Predetermined amount.

TABLE 2

|  | Control | Examples | | | | | Comparative examples | | | | | | | |
|---|---|---|---|---|---|---|---|---|---|---|---|---|---|---|
|  |  | 7 | 8 | 9 | 10 | 11 | 2 | 3 | 4 | 5 | 6 | 7 | 8 | 9 |
| Parts by weight: | | | | | | | | | | | | | | |
| Cl-PVC | 100 | 100 | 100 | 100 | 100 | 100 | 100 | 100 | 100 | 100 | 100 | 100 | 100 | 100 |
| MBS resin A | | | | | | 3 | | | | 1.5 | | | | 50 |
| MBS resin B | | | | | 3 | | | | 1.5 | | | | 50 | |
| MBS resin C | | | 3 | 40 | | | | 1.5 | | | | 50 | | |
| MBS resin D | | 3 | | | | | 1.5 | | | | 50 | | | |
| Heat coloration property (min.) | 100 | 170 | 170 | 150 | 160 | 150 | 110 | 105 | 105 | 100 | 195 | 110 | 95 | 85 |
| Heat penetration (° C.) | 125 | 123 | 124 | 120 | 125 | 125 | 124 | 124 | 125 | 125 | 112 | 114 | 117 | 118 |
| Impact strength (kg. cm./cm.²) | 2 | 3 | 4 | 12 | 3 | 2.5 | 2 | 2.5 | 2 | 2 | 5 | 7 | 4 | 3 |

Note.—MBS resin A: M(58%), B(2%), S (40%). MBS resin B: M (52%), B (10%), S (38%). MBS resin C: M (4%), B (70%), S (26%). MBS resin D: M (5%), B (90%), S (5%).

EXAMPLES 12–17 AND COMPARATIVE EXAMPLES 10-1 AND 10-2

|  | Parts by weight |
|---|---|
| Chlorinated polyvinyl chloride [1] | 100 |
| Methylmethacrylate-butadiene-styrene copolymer: | |
| MMA | 31.5 |
| B | 37.5 |
| S | 31 |
| Dibutyl tin maleate | 4 |
| Dibutyl tin laurate | 1 |
| Butyl stearate | 1 |

[1] Chlorine content 67% by weight; product of Nippon Carbide Kogyo K.K., Japan.

The above components were charged into a Henschel mixer and mixing was started. They were mixed further for 10 minutes after the temperature in the mixer reached 120° C. to obtain a resinous composition (a transparent mixture). Seven types of compositions were prepared by changing an amount of the MBS resin mixed and tests were made by using each of the compositions according to the test method stated previously. The results are given in the following Table 3. Table 3 also shows the results of a Comparative Example carried under the same conditions as in Example 14 except that ABS resin (AN—1%, B—44%, S—55% by weight) was used.

TABLE 3

|  | Control | Examples | | | | | | Comparative Examples | |
|---|---|---|---|---|---|---|---|---|---|
|  |  | 12 | 13 | 14 | 15 | 16 | 17 | 10-1 | 10-2 |
| Parts by weight: | | | | | | | | | |
| PVC | 100 | 0 | 0 | 0 | 0 | 0 | 0 | 0 | 0 |
| Cl-PVC | 0 | 100 | 100 | 100 | 100 | 100 | 100 | 100 | 100 |
| MBS resin | 0 | 0 | 3 | 5 | 10 | 20 | 30 | 40 | 50 | 0 |
| ABS resin | 0 | 0 | 0 | 0 | 0 | 0 | 0 | 0 | 10 |
| Heat coloration property (min.) | 219 | 160 | 180 | 211 | 238 | 232 | 210 | 181 | 148 | 120 |
| Heat penetration (° C.) | 72 | 110 | 110 | 109 | 109 | 109 | 107 | 104 | 97 | 107 |
| Impact strength (kg.cm./cm.²) | 2 | 1.5 | 2 | 3 | 7 | 14 | 16 | 18 | 18 | 5 |

EXAMPLES 18 AND 19 AND COMPARATIVE EXAMPLES 11 AND 12

The same chlorinated polyvinyl chloride as used in Examples 1–6 and the polyvinyl chloride as the material of the chlorinated polyvinyl chloride were mixed with 3 parts by weight of dibutyl tin maleate, 1 part by weight of dibutyl tin laulate and a methylmethacrylate-butadiene-styrene copolymer (MMA—35, B—40, S—25% by weight) of an amount shown in Table 4 in the same manner as in Examples 12–17 to obtain a composition. The results of the test performed by using the composition obtained are shown in the following Table 4.

TABLE 4

|  | Control | Comp. Ex. | | Control | Examples | |
|---|---|---|---|---|---|---|
|  |  | 11 | 12 |  | 18 | 19 |
| Parts by weight: | | | | | | |
| PVC | 100 | 100 | 100 | 0 | 0 | 0 |
| Cl-PVC | 0 | 0 | 0 | 100 | 100 | 100 |
| MBS resin | 0 | 10 | 20 | 0 | 10 | 20 |
| Heat coloration property (min.) | 200 | 180 | 150 | 120 | 150 | 150 |
| Difference from that of control | | −20 | −50 | | +30 | +30 |

It can be seen from the above result that the heat coloration property is degraded when the methylmethacrylate-butadiene-styrene copolymer is added to polyvinyl chloride, but the heat coloration property is improved when the above copolymer is added to chlorinated polyvinyl chloride.

EXAMPLES 20–21 AND COMPARATIVE EXAMPLES 13–20

|  | Parts by wt. |
|---|---|
| Chlorinated polyvinyl chloride (the same product as in Example 1) | 100 |
| Methylmethacrylate - butadiene - styrene copolymer (the same product as in Example 1). | |
| Tribasic lead sulfate | 3 |
| Dibasic lead stearate | 1 |
| Lead stearate | 0.5 |

The above components were mixed in the same manner as in Example 1 and a resinous composition for shaping was prepared. For comparison, a composition was prepared in the same manner except the use of an ABS (AN—15, B—30, S—55% by weight) resin, ABS resin (AN—2, B—44, S—54% by weight), acrylonitrile-styrene copolymer (AS resin), methyl methacrylate-styrene copolymer (MS resin) and butadiene-styrene copolymer (BS resin), respectively, instead of the MBS resin.

A test piece of the above composition was made and the result of testing its properties was as follows.

TABLE 5

|  | Control | Examples | | Comparative examples | | | | | | | | | |
|---|---|---|---|---|---|---|---|---|---|---|---|---|---|
|  |  | 20 | 21 | 13 | 14 | 13' | 14' | 15 | 16 | 17 | 18 | 19 | 20 |
| Parts by weight: | | | | | | | | | | | | | |
| Cl-PVC | 100 | 100 | 100 | 100 | 100 | 100 | 100 | 100 | 100 | 100 | 100 | 100 | 100 |
| MBS resin | | 10 | 20 | | | | | | | | | | |
| ABS resin [1] | | | | 10 | 20 | | | | | | | | |
| Do.[2] | | | | | | 10 | 20 | | | | | | |
| AS resin | | | | | | | | 10 | 20 | | | | |
| MS resin | | | | | | | | | | 10 | 20 | | |
| BS resin | | | | | | | | | | | | 10 | 20 |
| Heat coloration property (min.) | 100 | 180 | 185 | 90 | 80 | 95 | 85 | 70 | 50 | 100 | 90 | 80 | 70 |
| Difference from that of control | | +80 | +85 | −10 | −20 | −5 | −15 | −30 | −50 | 0 | −10 | −20 | −30 |

[1] AN, 15; B, 30; S—, 25% by weight.
[2] AN, 2; B, 44; S, 54% by weight.

Note.—AS resin (commercially available); Tyril 767 (Asahi Dow Co.) MS resin (commercially available); Ferlon 150 (Asahi Dow Co.). BS resin, B, 75% by weight; S, 25% by weight.

It can be seen from the above result that the heat coloration property is degraded when the other resin is added to chlorinated polyvinyl chloride, but on the contrary, the heat coloration property is remarkably increased when the methylmethacrylate-styrene-butadiene copolymer is added thereto.

EXAMPLES 22–24 AND COMPARATIVE EXAMPLES 21–23

Each 100 parts by weight of polyvinyl chloride and chlorinated polyvinyl chloride (the same product as in Example 1) was mixed with 3.5 parts by weight of basic lead sulfite, 1 part by weight of dibasic lead stearate, 0.5 part by weight of butyl stearate and a methylmethacrylate - butadiene - styrene copolymer (MMA—18, B—68, S—14 percent by weight) of an amount stated in Table 6 and a test was performed to compare polyvinyl chloride with heat resisting polyvinyl chloride with respect to these test pieces.

TABLE 6

| | Control | Comp. examples | | | Control | Examples | | |
|---|---|---|---|---|---|---|---|---|
| | | 21 | 22 | 23 | | 22 | 23 | 24 |
| Parts by weight: | | | | | | | | |
| PVC | 100 | 100 | 100 | 100 | | | | |
| Cl-PVC | | | | | 100 | 100 | 100 | 100 |
| MBS resin | 0 | 10 | 20 | 30 | 0 | 10 | 20 | 30 |
| Heat coloration property (min.) | 180 | 170 | 160 | 150 | 120 | 170 | 190 | 190 |
| Difference from that of control | | −10 | −20 | −30 | | +50 | +70 | +70 |

It can be seen from the above table that depending upon the blend proportion the heat coloration property of the composition containing MBS resin tends to be a little higher than that of PVC resin having completely the same constituents in which MBS resin is not incorporated. It is further seen from this table that the heat coloration property of the composition is worse in the case of PVC resin than in the case of the control, and it becomes exceedingly good in the case of Cl-PVC resin.

EXAMPLES 25 AND 26

A test was made in the same manner as in Example 1 except the use of a chlorinated PVC resin having a chlorine content of 63% and 65% to obtain the following result as shown in Table 7. In these examples, 15 parts by weight of an MBS resin (the same as in Example 1) was used.

TABLE 7

| | Chlorine contents, 63% | | Chlorine contents, 65% | |
|---|---|---|---|---|
| | Control | Ex. 22 | Control | Ex. 23 |
| Parts by weight: | | | | |
| Cl-PVC | 100 | 100 | 100 | 100 |
| MBS resin | | 15 | | 15 |
| Each coloration property (min.) | 120 | 191 | 112 | 192 |

What is claimed is:
1. A shaping composition of chlorinated polyvinyl chloride having improved heat coloration properties consisting essentially of a blend of
  (A) chlorinated polyvinyl chloride having a chlorine content of not less than 60% by weight and
  (B) a copolymer consisting of above 1% but up to 70% by weight of methylmethacrylate, 1–95% by weight of butadiene and 3–65% by weight of styrene, the sum of these three components of the copolymer being 100% by weight, said copolymer (B) being present in an amount of from 3–40 parts per 100 parts by weight of (A).

2. The shaping composition of claim 1 wherein said chlorine content is 63–70% by weight.

3. The shaping composition of claim 1 wherein the amount of the butadiene-styrene-methylmethacrylate copolymer is 5–30 parts by weight.

4. The shaping composition of claim 1 wherein said copolymer (B) consists of 2–60% by weight of methylmethacrylate, 2–80% by weight of butadiene and 14–55% by weight of styrene, the sum of these components being 100% by weight.

References Cited

UNITED STATES PATENTS

| 3,560,592 | 2/1971 | Decroly et al. | 260—876 |
| 3,288,886 | 11/1966 | Himei | 260—876 |
| 3,268,626 | 8/1966 | Jennings et al. | 260—891 |

FOREIGN PATENTS

| 722,769 | 11/1965 | Canada | 260—876 |

MURRAY TILLMAN, Primary Examiner

C. SECCURO, Assistant Examiner

U.S. Cl. X.R.

260—890, 891, 23.7 H